United States Patent
Gapontsev et al.

(10) Patent No.: US 9,444,215 B1
(45) Date of Patent: *Sep. 13, 2016

(54) ULTRA-HIGH POWER SINGLE MODE FIBER LASER SYSTEM WITH NON-UNIFORMLY CONFIGURED FIBER-TO-FIBER ROD MULTIMODE AMPLIFIER

(71) Applicants: Valentin Gapontsev, Worcester, MA (US); Igor Samartsev, Oxford, MA (US); Dimitri Yagodkin, Burbach (DE)

(72) Inventors: Valentin Gapontsev, Worcester, MA (US); Igor Samartsev, Oxford, MA (US); Dimitri Yagodkin, Burbach (DE)

(73) Assignee: IPG PHOTONICS CORPORATION, Oxford, MA (US)

(*) Notice: Subject to any disclaimer, the term of this patent is extended or adjusted under 35 U.S.C. 154(b) by 260 days.

This patent is subject to a terminal disclaimer.

(21) Appl. No.: 14/199,638

(22) Filed: Mar. 6, 2014

Related U.S. Application Data

(60) Provisional application No. 61/773,370, filed on Mar. 6, 2013, provisional application No. 61/773,365, filed on Mar. 6, 2013.

(51) Int. Cl.
*H01S 3/00* (2006.01)
*H01S 3/094* (2006.01)

(52) U.S. Cl.
CPC .......... *H01S 3/094003* (2013.01); *H01S 3/005* (2013.01)

(58) Field of Classification Search
CPC .............. H01S 3/06708; H01S 3/005; H01S 3/094003; H01S 3/094042
USPC ........................................................ 359/333
See application file for complete search history.

(56) References Cited

U.S. PATENT DOCUMENTS

| 5,818,630 | A | * | 10/1998 | Fermann | H01S 3/067 359/340 |
| 7,813,603 | B2 | * | 10/2010 | Nikolajsen | G02B 6/2817 359/334 |
| 2006/0280217 | A1 | * | 12/2006 | Zervas | H01S 3/067 372/72 |
| 2009/0207871 | A1 | * | 8/2009 | Koshimae | H01S 3/1312 372/38.07 |
| 2012/0217375 | A1 | * | 8/2012 | Lin | H01S 3/0057 250/208.1 |
| 2014/0314106 | A1 | * | 10/2014 | Fomin | H01S 3/06708 372/6 |

* cited by examiner

*Primary Examiner* — Mark Hellner
(74) *Attorney, Agent, or Firm* — Yuri Kateshov, Esq.; Timothy J. King, Esq.

(57) ABSTRACT

A high power single mode ("SM") laser system includes an amplifier configured with a monolithic fiber to rod fiber waveguide which is structured with a multimode ("MM") core and at least one cladding surrounding the core. The MM core is configured with a small diameter uniform input region receiving and guiding a SM signal light, a mode-transforming frustoconical core region expanding outwards from the input region and a relatively large diameter uniform output portion. The high power laser system is further structured with a MM pump light delivery fiber having a numerical aperture $NA_2$, which is at most equal to that one of the output core portion. The amplifier and pump light output fiber traverse an unconfined delivery cable and terminate upstream from a mirror which is configured to focus the incident pump light into the core of the amplifier in a counter-propagating direction. The mirror is further structured with an opening aligned with the optical axis of the amplifier and configured to provide a lossless passage of amplified signal light in a propagating direction.

20 Claims, 1 Drawing Sheet

1A-1A

ULTRA-HIGH POWER SINGLE MODE FIBER LASER SYSTEM WITH NON-UNIFORMLY CONFIGURED FIBER-TO-FIBER ROD MULTIMODE AMPLIFIER

BACKGROUND OF THE DISCLOSURE

1. Field of the Disclosure

The disclosure relates to an ultra-high power fiber laser system provided with a monolithic fiber-to-rod fiber amplifier directly delivering signal light in substantially a fundamental mode to a laser head over free space.

2. Background of the Disclosure

PRIOR ART

The dramatic rise in output power from rare-earth-doped fiber sources over the past decade, via the use of double clad fibers led to a range of fiber-laser system with outstanding performance in terms of output power, beam quality, overall efficiency, and wavelength flexibility. Yet the power scaling of modern high power fiber laser systems is far from satisfying ever increasing industry demands.

As well understood by one of ordinary skill, the premise, underlying an efficient high power, single or low mode ("SM/LM") fiber amplifier, is rather simple: maximally enlarge the core diameter of SM/LM active fibers and minimize the length of the MM active core guiding light. The reason for a large core diameter and short length can be easily understood by the necessity of having high power peak and average-power levels and substantially diffraction-limited laser outputs.

However, increasing the core diameter of waveguides leads to increasing the number of guided high order modes ("HOM") which degrade the beam quality. This can be mitigated by the core's greatly reduced numerical aperture ("NA"), but doing so critically limits the amount of pump light that can be coupled into the core. In this case, the only viable option in the prior art for reaching high powers is clad pumping. Using clad pumping requires increasing the necessary length of active fibers since absorption of pump light coupled into the cladding is about eight times less efficient than that coupled into the core. Hence a threshold for the onset of NLEs radically lowers. Numerous techniques for improving the scalability of high power laser systems capable of emitting SM/LM outputs have been developed and are briefly discussed immediately below.

One critical development greatly affecting the scalability includes a double clad fiber which is well known to an artisan in the fiber laser arts. For example, U.S. Pat. No. 5,818,630 and its extended family of patents disclose a high power fiber laser system including a double clad MM active fiber amplifier. A good quality of output beam is realized by a mode matching element—so called mode converter well known to one of ordinary skill in the optics as a beam expander—located between SM passive and MM active fibers. The converter is configured to expand the SM to a size of fundamental mode of the active fiber which, as one of ordinary skill knows, may approximately be described as a Gaussian shape.

This design does not come without certain liabilities. Obviously, it is bulky and not rugged limiting thus its use to a relatively stress-free environment, which is not easy to create and maintain in the field. If a tapered fiber is used as a mode matching element, it is fused to ends of respective SM and MM fibers. In this configuration, the power losses at splices between fibers and distortion of a diffraction limited beam are sharply increased. Also, because of the double-clad configuration, a pumping technique includes coupling pump light into an inner cladding which increases the length of the amplifier and rises a thresholds for NLEs.

Recently, the fiber laser industry has turned to crystal fiber rods typically used in output stages of amplifier chains to address the scalability of fiber amplifiers. Based on air hole clad technology, a crystal fiber rod includes a double clad structure with a doped core, large diameter pump core or inner cladding and outer cladding.

The SM doped core of the rod fiber has a very small NA, and is made from fused silica/quartz which typically hosts a low dopant concentration. The low numerical aperture limits the amount of high power pump light which may be coupled into the core in amounts necessary for reaching ultrahigh powers in a kW-MW range depending on whether a laser system operates in CW or pulsed regime. Accordingly, a sufficient amount of pump light can be coupled only into the pump core or inner cladding. To fully utilize clad-coupled pump light, thus, a fiber rod should have a length varying between several tens (typically exceeding 50) of centimeters and meters. Even the shortest available fiber rod thus is detrimentally affected by the presence of NLEs. The latter, of course, critically limits the laser's power scalability.

A low concentration of ions in fiber rods, such as ytterbium ("Yb"), is typically about 7xx ppm. With such a low dopant concentration, absorption of pump light is also low. To obtain the desired kW-MW powers, the pump light should be emitted at very high powers. To provide adequate absorption of the pump light, the overall length of a fiber rod should be increased. As discussed above, increasing the overall length lowers a threshold for NLEs which, in turn, limits power scalability an amplifier.

An open-end structure of fiber rods is another area of concern. Typically, launching an input signal throughout air holes can be realized only by micro-optics. The latter, of course, complicates the entire system configuration and makes the latter cumbersome and expensive. The presence of air in holes lowers thermal conductivity properties. In particular, the air holes slow dissipation of heat which, in turn, may damage the rod itself and cause an environmental hazard.

The use of crystal fiber rods and amplifying fiber devices based on the rod is disclosed in U.S. Pat. No. 7,813,603 ("603"). The structure as taught by the '603 includes an amplifying medium, at least one pump light delivery fiber, and a reflective element directing the pump light into the amplifying medium in a direction which is counter to the direction of signal light propagation. The amplifying medium is configured as a multi-clad photonic crystal fiber rod with an inner cladding, referred to as a multimode pump core which receives the reflected pump light in a direction counter to a signal propagating direction. As discussed above, because of a small SM doped core, the absorption of the reflected pump light occurs along a substantial fiber length to avoid the onset of NLEs at a low power level. The disclosed structure operates at no more than a 150 W output power to prevent damage to the doped core.

Summarizing the above, the design of high power fiber systems faces difficult challenges because of the following factors: nonlinear effects in fibers in general and fiber rods in particular, loss of fundamental mode power to high order modes ("iOM"); pump brightness and, of course, excessive heat generation. Although each factor limits power scaling independently, they are also interrelated.

A need, therefore, exists for an ultra-high power SM fiber laser system substantially overcoming the above-discussed disadvantages of the known systems.

Another need exists for a compact, portable SM ultra-high power fiber laser system capable of outputting kW level average and MW level peak powers.

BRIEF DESCRIPTION OF THE DISCLOSURE

The disclosed high power SM laser system is configured with a booster stage including an unconfined monolithic fiber-to-rod fiber booster which is defined by consecutive fiber input, transforming and fiber rod output regions. The monolithic MM waveguide is structured with a continuous MM core and at least one cladding which coextends and surrounds the core. The input region of the core extending through the input fiber region of the waveguide is small and configured to support SM signal light which is received from a seed source.

Somewhere along the length of the waveguide, the core expands assuming a bottleneck-shaped cross-section, which defines the transforming region running into the output amplifying region. The output region is structured with a uniform diameter larger than the uniform diameter of the input core portion. Despite the possibility of supporting multiple high order modes ("HOM"), it is a single, fundamental mode that is greatly amplified compared with the amplification of HOMs which are thus reduced to noise. As a consequence, the amplifier emits light in substantially a single, fundamental mode. The booster has no splices and hence neither splice losses nor the possibility of coupling between the fundamental and HOMs.

The booster may be unconfined extending over free space and delivering signal light to a working zone without the use of customary SM passive delivery fibers. The increased core diameter of the booster allows greater pump light powers to be absorbed in a short core. In particular, at least one MM pump light fiber is provided in close proximity to the output end of the booster. The disclosed configuration of a pump mechanism allows pump light to be coupled into the core of the booster in a direction counter to a signal propagating direction which, as known to the artisan, intensifies absorption of pump light.

The counter-propagating coupling of pump light is provided by a reflective element spaced from the output ends of respective booster and delivery fiber. Configuring the pump light delivery fiber with a numerical aperture ("NA") smaller than that of the booster and the desired curvature of the reflective element help coupling the reflected pump light into the output core end of the booster.

The large core diameter of the output region and pumping mechanism are important parameters allowing the booster to be relatively short. The length is selected to provide absorption of coupled pump light mainly along the output core region of the rod fiber region of the booster. Despite great pump light powers, the reduced length minimizes the onset of NLEs.

The reflective element is configured with an opening aligned with the optical axis of the booster. The dimensions of the opening are selected to prevent meaningful pump light losses and provide no losses of amplified signal light traversing the opening in a propagating direction.

High power density of the amplified signal light is hazardous to fiber surfaces. To reduce it, the disclosed system is configured with a coreless termination block typically made from quartz. The block is positioned between the ends of respective booster and pump light delivery fiber and reflective element. The upstream face of the block is fused to fiber ends of respective booster and pump fiber.

The compactness of the disclosed booster is further improved by providing a sleeve enclosing the rod fiber portion, termination block and reflective element. The sleeve is coupled to the enclosed optical components to define an end package also known as a laser head.

BRIEF DESCRIPTION OF THE DRAWINGS

The above and other features and advantages of the disclosed system will become readily apparent from the following specific description accompanied by the drawings, in which.

SPECIFIC DESCRIPTION

Figure 1:
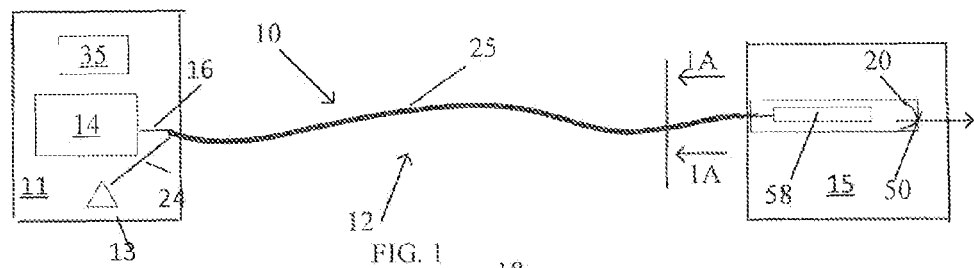
FIG. 1 shows an optical scheme of the disclose booster stage.

Reference will now be made in detail to embodiments of the invention. Wherever possible, same or similar numerals are used in the drawings and the description to refer to the same or like parts or steps. The drawings are in simplified form and are not to precise scale. Unless specifically noted, it is intended that the words and phrases in the specification and claims be given the ordinary and accustomed meaning to those of ordinary skill in the fiber laser arts. The word "couple" and similar terms do not necessarily denote direct and immediate connections, but also include mechanical optical connections through free space or intermediate elements.

Figure 1A:
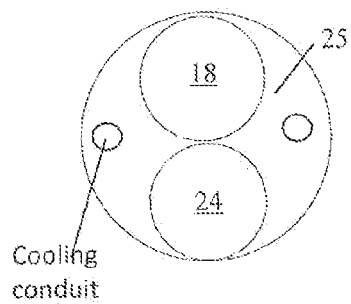
FIG. 1A is a cross-sectional view of booster stage along lines A-A in FIG. 1.

Referring to FIGS. 1 and 1A, an exemplary ultra-high power fiber laser system 10 is capable of emitting multi-kW and higher signal light in substantially a fundamental mode and MW peak-power output. The system 10 may be configured with a main console which includes one or a plurality of cabinets 11 housing one or more pump sources 13, seed laser 14, optional pre-amplifying cascade(s), electronics, cooling systems and all other devices and components which are cumulatively denoted as 35 and configured to assist in generating an ultra-high power SM system output.

The SM signal light emitted by seed laser 14 is further guided along and amplified in a fiber booster stage 12 configured with a flexible delivery cable 25 which extends over free space between the console and a laser head 15. The booster stage 12 further includes a fiber booster 18 traversing cable 25 and configured as an active double clad fiber with a MM core which is doped with one or more light emitters, such as rare-earth elements. At least one pump light output fiber 24 also extends over free space within delivery cable 25 between cabinet 11 and laser head 15, as shown in FIG. 1A. The laser head 15 is configured with a reflective element structured to couple pump light into the amplifier's output end in a counter-propagating direction. Due to the structural specifics of booster stage 12 along with pumps and laser head 15, system 10 is operative to emit a substantially diffraction limited output beam in a signal light propagating direction.

The high power SM laser system 10 may have multiple amplifying stages or a single one as shown, which is referred to as a final amplifying stage known as booster stage 12 to one of ordinary skill in the art. The seed source 14 is preferably configured as a single frequency, SM fiber laser with a SM output passive fiber 16 delivering signal light at the desired wavelength to booster stage 12.

The output fiber 16 is spliced to booster 18 (FIG. 2) traversing delivery cable 25 and having a MM core which is doped with one or multiple different types of light emitters selected from known rare earth elements. The booster 18 may include separately manufactured fiber and fiber rod parts fused together, but preferably is manufactured as a monolithic, one piece component. The signal light is amplified to the desired level as it is emitted from booster 18. Preferably, system 10 operates in the pulsed regime and is capable of emitting MW SM signal light beam. If system 10 operates in the continuous regime, average output powers may reach high kW levels. Regardless of the operational regime, an $M^2$ beam quality parameter of the emitted signal light varies between 1.1 and 1.5.

The high power output of booster stage 12 is coupled into laser head 15 which, as known to one of ordinary skill in the art, is provided with beam-guiding optics and located close to the workpiece to be laser treated. In particular, laser head 15 encloses a terminal block or buffer 20 configured to prevent the optical surface damage, as known to the artisan. The output diffraction limited signal beam is further guided through a central opening of mirror 22 in the signal propagating direction, as will be disclosed in detail herein below.

Figure 2:
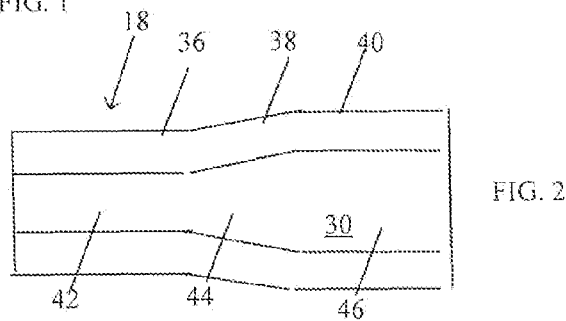
FIG. 2 illustrates an amplifier of the booster stage of FIG. 1.

Referring FIG. 2, booster 18 which may have a double clad configuration with a doped MM core 30 and coextending therewith claddings. A uniformly shaped input fiber portion 36 is coupled to passive fiber 16 which guides SM signal light from seed 14 (FIG. 1). An output rod fiber portion 40 of amplifier 18 is also uniformly shaped and has respective diameters of core and cladding parts larger than those of the input fiber region. A frustoconical mode transforming portion 38 bridges input and output fiber portions 36 and 40, respectively.

The continuous core MM 30 is configured, in a preferred embodiment, with at least three portions: an input uniformly dimensioned region 42, a frustoconical mode transforming region 44 and output amplifying region 46. The excitation of only the fundamental mode in doped MM core 30 is realized by initially matching a mode field diameter ("MFD") of the fundamental mode of MM core 30 with that of passive fiber 16. It is also desirable that the shapes, i.e., intensity profiles, of respective single and fundamental modes also substantially match one another. Since the MFDs of respective SM delivery fiber 16 and amplifier 18 substantially match, there is no need for a mode-matching optics—the faucets of respective fibers are directly spliced to one another.

The excited fundamental mode is guided along input core region 42 with a relatively small diameter $d_1$. Entering mode transforming core region 44, the fundamental mode adiabatically expends to have a second diameter $d_2$ which is larger than the diameter of input core region 42. As the fundamental mode expands and propagates along respective transforming and amplifying core portions 44 and 46, respectively, practically no HOMs are excited which allows the amplified signal light exits booster 18 in the fundamental mode.

The core 30 may have two regions instead of the above disclosed three. In particular, core 30 may be manufactured only with an input and mode transforming core regions. The cladding of amplifier 18 may be configured with an inner surface extending complementary to the outer surface of MM core 30 and thus have the same two or three differently dimensioned and shaped regions. Alternatively, the cladding may have a uniform cross-section.

Figure 3:
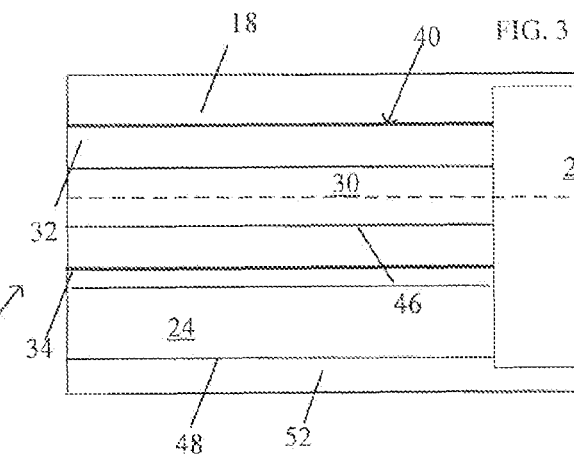
FIG. 3 illustrates a laser head receiving the booster stage of FIG. 1.

Turning to FIG. 3, optionally, booster stage 12 (FIG. 1) may be provided with buffer 20. The upstream, input face of buffer 20 is coupled to the output ends of respective pump fiber and amplifier 24, 18, respectively. The buffer 20 may be configured as a silica-glass coreless rod and operative to prevent the damage to fiber ends due to the reduced power density of the output beam.

The pump light delivery fiber 24 is configured as a passive, MM fiber. Preferably, a downstream end region 48 of delivery fiber 24 extends parallel to output region 40 of amplifier 18. The output ends of amplifier 18 and pump fiber 24, respectively, may be directly bonded to the upstream face of buffer 20, viewed along a signal light propagation direction Ls. Other spatial relationships between these two fibers also within the scope of the disclosure. For example one, of the delivery and active fibers can be bonded to the upstream face of the buffer at an angle relative to the optical axis of the other. More than a single delivery fiber can be used in combination with amplifier 18.

The reflective element 22 may be configured as a spherical or aspherical mirror. An opening 50, provided in mirror 22 and centered on the optical axis of system 10, is dimensioned to prevent or minimize pump light losses in the propagating direction. Preferably, opening 50 has a diameter twice as large as a beam diameter, but may be somewhat larger, for example, thrice the diameter of the beam waist. The diameter of mirror 22 is substantially the same as a distance between the downstream facet of booster 18 and opening 50.

Figure 4:
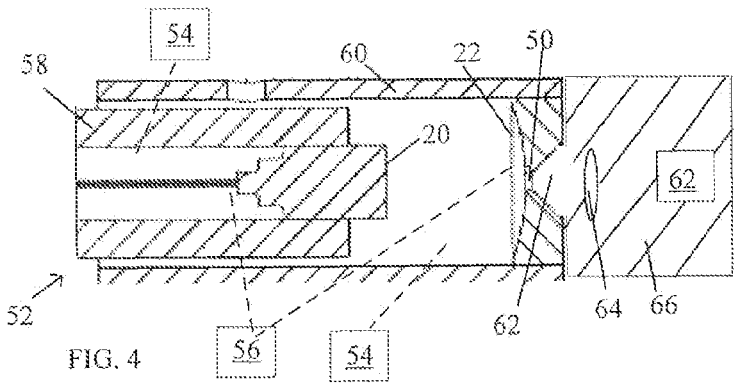
FIG. 4 is an exemplary schematic of the terminal package of FIG. 3.

Referring to FIGS. 3 and 4, the downstream end regions 40 and 48 of respective booster 18 and pump light output fiber 24 extend beyond the delivery cable 25 of FIG. 1 and are mounted within a protective sleeve 52 adjacent to the output end of the delivery cable. In particular, sleeve 52 may surround output region 40 of booster 18 and downstream end region 48 of pump light delivery fiber and mirror 22. If buffer 20 is provided, it is also enclosed within sleeve 52 which hermetically seals the enclosed components adhered to the inner surface of sleeve 52. Any suitable adhering means, such as epoxy, can be used as adhering material. Thus, sleeve 52 creates substantially impurities free environment which may be further enforced by a stream of fluid, such as air, periodically pumped into the sleeve by a fluid delivery means 54.

The end package of optical components enclosed within sleeve 52 is adjustable to provide a reliable coupling of pump light into core 30 of amplifier 18 and substantially lossless passage of signal light through an output sleeve opening or passage 62. In particular, an adjustment mechanism 56 is operative to displace the downstream ends of waveguide 18 and delivery fiber 24, respectively, and mirror 22 in XYZ planes relative to one another. The XYZ actuators are well known to one of ordinary skill in the mechanical art and can be easily adjusted for the purposes of this disclosure.

The sleeve 52 may include two U-shaped caps 58 and 60 overlapping one another to define a closed space. The large diameter cup 60 is provided with passage 62 defined in the cup's downstream bottom and aligned with opening 50 of mirror 22, which is mounted to this bottom. The other cup 58 receives the output end regions of respective fibers 24 and 18 and buffer 20.

The disclosed structure can be used in conjunction with a harmonic generator to obtain wavelengths that cannot be directly accessed with modern laser technology. Nonlinear frequency conversion techniques allow generating laser radiation at wavelengths in the UV, visible and IR spectral ranges. As known to the artisan, the harmonic generation is realized by a nonlinear crystal 62. Structurally, crystal 62 and collimating optics 64 may be placed inside a housing 66 which is optically and mechanically coupled to sleeve 52.

The disclosed system is subject to high thermo-dynamic stresses due ultra-high powers. To combat deleterious effects of thermal stresses, the disclosed system 10 is configured with a cooling means. The cooling means may include a source of pressurized cooling agent, such as water or any other suitable fluid traversing one or more flexible pipes. The flexible pipe may be provided within delivery cable 25 or outside it. Alternatively, the cooling means include a layer of polymeric material, temperature-resistant material coated upon the outer surface of the amplifier.

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention should be construed to cohere with all modifications that may fall within the scope of the appended claims.

The invention claimed is:

1. An ultra-high power fiber laser system, comprising:
   a base laser console enclosing:
      a single mode ("SM") seed source emitting SM signal,
      a SM passive fiber receiving and guiding the SM signal light in a propagating direction,
      a fiber pigtailed laser diode pump outputting pump light, and
      a utility assembly configured to support a laser system operation including control and safety electronics;
   an optical laser head spaced from the base laser console;
   at least one flexible delivery cable extending between the console and laser head;
   a fiber to fiber rod booster amplifier having a major length traversing the delivery cable and provided with an output end which is directly coupled to the laser head, the booster amplifier being configured with an all doped multimode (MM") monolithic core configured with at least:
      a uniformly dimensioned input core region coupled to a downstream end of a core of the SM passive fiber, the cores of respective input core region and SM fiber being configured with respective mode field diameters ("MFD") which substantially match one another,
      a mode transforming core region expanding from the input core section and configured to expand the MFD of the SM while preventing an excitation of high order modes,
      an output amplifying uniformly dimensioned core region extending from the mode transforming core region and having a diameter larger than that of the input core region, wherein the booster fiber amplifier is operative to emit system output light in substantially the SM with a power varying in a kW-MW range;
   a mirror mounted in the laser head and spaced downstream from the booster amplifier; and
   a least one MM pump light delivery fiber extending through the delivery cable and guiding the pump light so that the pump light is incident on the mirror configured to redirect the pump light in a counter-propagating direction to end-pump the MM core of the booster amplifier.

2. An ultra-high power single mode ("SM") booster stage, comprising:
   a fiber to fiber rod amplifier extending through free space and configured with a multimode ("MM") non-uniformly dimensioned core, which guides and amplifies signal light, and a cladding coextending with and surrounding the core;
   a MM pump light output fiber extending through free space and including a terminal region coextending with a terminal region of the amplifier;
   a laser head receiving the terminal regions of respective amplifier and pump light output fibers; and
   a mirror provided in the laser head and having a central opening, which is dimensioned to be traversed by the amplified signal light in the propagating direction, and the mirror being configured to redirect the pump light incident thereon in a counter-propagating direction so that the pump light is coupled into the core of the amplifier.

3. The booster stage of claim 2 further comprising an unconfined delivery cable traversed by the amplifier and pump light output fiber, the terminal regions of respective output fiber and amplifier extending substantially parallel to one and projecting over a downstream end of the delivery cable into the laser head.

4. The booster stage of claim 2, wherein the MM core is doped with light emitters and structured with:
   a small diameter uniform input region configured to guide a single mode ("SM") signal light along a fiber part of the amplifier in a propagating direction, and
   a mode transforming region bridging the input and output portions.

5. The booster stage of claim 4, wherein the MM core further includes a large diameter uniform output region extending from the mode transforming region and guiding the SM signal light along the terminal region of the amplifier.

6. The booster stage of claims 2 through 4 further comprising:
   a buffer fused to the terminal regions of respective amplifier and output fiber and mounted to the laser head, and
   a sleeve enclosing at least a part of the terminal regions of respective amplifier and pump fiber, buffer and mirror and coupled thereto, wherein the mirror and terminal regions of respective amplifier and output fiber are adjustable relative to one another so as to couple the pump light into the MM core of the amplifier while outputting the amplified SM signal light through the opening in the propagating direction.

7. The booster stage of claims 2 and 3, wherein a numerical aperture of the pump light is at most equal to a numerical aperture of the output core region of the amplifier.

8. The booster stage of claim 2, wherein the mirror is spherical or aspherical.

9. The booster stage of claims 2 through 5 further comprising an air supply system operative to introduce an air stream into the sleeve so as to carry out impurities out of the sleeve as the air stream exits through the hole of the mirror.

10. The booster stage of claim 2 further comprising an actuator operative displace the mirror and the terminal regions of respective amplifier and delivery fiber in XYZ planes relative to one another.

11. The booster stage of claim 2, wherein the fiber to fiber rod amplifier is continuous between input and output terminal regions thereof.

12. The booster stage of claim 2, wherein the fiber to fiber rod amplifier includes fiber and fiber rod parts fused together.

13. The booster stage of claims 2 through 5, wherein the sleeve includes two cup-shaped parts insertable one into another and coupled to one another so as to provide an impurities-fee interior of the laser head.

14. An ultra-high power fiber laser system comprising:
a seed laser source configured to deliver a signal;
the booster stage of any one of claims 2-12.

15. The ultra-high power fiber laser system of claim 14 further comprising a housing enclosing a system operative to generate a high harmonic of a fundamental frequency of the amplified SM signal light, the system being configured with a housing optically and mechanically coupled to the laser head at a distance from the terminal regions of respective amplifier and pump light output fiber.

16. The ultra-high power fiber laser system of claim 15, wherein the laser head and housing are configured with respective passages aligned with the opening of the mirror and guiding the amplified signal light in the propagating direction from the laser head into the housing.

17. The ultra-high power fiber laser system of claim 14 further comprising a main console spaced from the laser head and housing the seed laser source, the seed source being provided with a SM passive seed output fiber fused to an upstream region of the amplifier within the main console, the seed output fiber being provided with a core configured with a mode field diameter which substantially matches that one of the input region of the MM core of the amplifier.

18. The ultra-high power fiber laser system of claim 17 further comprising a utility assembly enclosed within the main console and configured to support a laser system operation, the utility assembly including control and safety electronics.

19. The ultra-high power fiber laser system of claim 17 further comprising a cooling system configured to reduce thermo-dynamic stresses produced by the signal and pump lights within the amplifier, the cooling system being configured with an outer layer of polymeric material coated upon an outer surface of the amplifier and capable of withstanding a temperature of up to a several hundred ° C.

20. The ultra-high power fiber laser system of claim 19, wherein the cooling system includes a source of coolant housed within the main console, at least one flexible pipe having an input, which is coupled to the source, and output, the flexible pipe having a major length thereof extending either within the delivery cable or outside the delivery cable; and a cooling fluid traversing the flexible pipe.

* * * * *